United States Patent
Bohannon et al.

(10) Patent No.: US 8,224,863 B2
(45) Date of Patent: Jul. 17, 2012

(54) EQUIVALENCE CLASS-BASED METHOD AND APPARATUS FOR COST-BASED REPAIR OF DATABASE CONSTRAINT VIOLATIONS

(75) Inventors: Philip L. Bohannon, Bridgewater, NJ (US); Wenfei Fan, Somerset, NJ (US); Michael E. Flaster, Tenafly, NJ (US); Rajeev Rastogi, New Providence, NJ (US)

(73) Assignee: Alcatel Lucent, Paris (FR)

( * ) Notice: Subject to any disclaimer, the term of this patent is extended or adjusted under 35 U.S.C. 154(b) by 1742 days.

(21) Appl. No.: 11/025,846

(22) Filed: Dec. 29, 2004

(65) Prior Publication Data
US 2006/0155743 A1 Jul. 13, 2006

(51) Int. Cl.
*G06F 17/30* (2006.01)
(52) U.S. Cl. ........................................... 707/802
(58) Field of Classification Search .............. 707/100, 707/1, 3–5, 691, 702, 802, 806; 714/37–38
See application file for complete search history.

(56) References Cited

U.S. PATENT DOCUMENTS

| | | | |
|---|---|---|---|
| 5,706,494 A * | 1/1998 | Cochrane et al. | 707/2 |
| 6,189,010 B1 * | 2/2001 | Isip, Jr. | 1/1 |
| 6,216,109 B1 * | 4/2001 | Zweben et al. | 705/7.12 |
| 6,453,314 B1 * | 9/2002 | Chan et al. | 707/3 |
| 7,020,869 B2 * | 3/2006 | Abrari et al. | 717/108 |
| 7,028,057 B1 * | 4/2006 | Vasudevan et al. | 707/203 |
| 2005/0086562 A1 * | 4/2005 | Demsky et al. | 714/100 |

* cited by examiner

*Primary Examiner* — Cam-Linh Nguyen
(74) *Attorney, Agent, or Firm* — Ryan, Mason & Lewis, LLP

(57) ABSTRACT

Methods and apparatus are provided for identifying constraint violation repairs in data that is comprised of a plurality of records, where each record has a plurality of cells. A database is processed, based on a plurality of constraints that data in the database must satisfy. At least one constraint violation to be resolved is identified based on a cost of repair and the corresponding records to be resolved and equivalent cells are identified in the data that violate the identified at least one constraint violation. A value for each of the equivalent cells can optionally be determined, and the determined value can be assigned to each of the equivalent cells. The at least one constraint violation selected for resolution may be, for example, the constraint violation with a lowest cost. The cost of repairing a constraint is based on a distance metric between the attributes values.

26 Claims, 4 Drawing Sheets

FIG. 1

CUST — 110

| | PHNO | NAME | STREET | CITY | STATE | ZIP | WT |
|---|---|---|---|---|---|---|---|
| $t_0$ | 949-1212 | ALICE SMITH | 17 BRIDGE | MIDVILLE | AZ | 05211 | 2 |
| $t_1$ | 555-8145 | BOB JONES | 5 VALLEY RD | CENTRE | NY | 10012 | 2 |
| $t_2$ | 555-8195 | BOB JONES | 5 VALLEY RD | CENTRE | NJ | 10012 | 1 |
| $t_3$ | 212-6040 | CAROL BLAKE | 9 MOUNTAIN | DAVIS | CA | 07912 | 1 |
| $t_4$ | 949-1212 | ALI STITH | 27 BRIDGE | MIDVILLE | AZ | 05211 | 1 |

EQUIP — 130

| | PHNO | SERNO | EQMFCT | EQMODEL | INSTDATE | WT |
|---|---|---|---|---|---|---|
| $t_5$ | 949-1212 | AC13006 | AC | XE5000 | MAR-02 | 2 |
| $t_6$ | 555-8145 | L55001 | LU | ze400 | JAN-03 | 2 |
| $t_7$ | 555-8195 | L55011 | LU | ze400 | MAR-03 | 1 |
| $t_8$ | 555-8195 | AC22350 | AC | XE5000 | FEB-99 | 1 |
| $t_9$ | 949-1212 | L32400 | LU | ze400 | OCT-01 | 1 |

INCLUSION DEPENDENCIES: — 150
(1) equip[phno] ⊆ cust[phno]

FUNCTIONAL DEPENDENCIES: — 170
(2) cust[phno] → cust[name, street, city, state, zip]
(3) cust[zip] → cust[city,state]
(4) cust[name, street, zip] → cust[phno]
(5) equip[serno] → equip[phno, eqmfct, eqmodel, instdate]
(6) equip[phno, eqmfct, eqmodel] → equip[serno]

FIG. 2

```
Procedure GEN-REPAIR (D, C)
Input: Database D, constraint set C.
Output: Database repair D'.
begin
1.   ε := {{(t, A)} : t ∈ R, A ∈ attr(R)};
2.   Initialize unResolved sets for FDs and INDs;
3.   while (unResolved is not empty) {
4.      (t, target, C) := PICKNEXT ();
5.      if (C is an FD) then
6.         FD-RESOLVE-TUP(target, C);
7.      else
8.         IND-RESOLVE-TUP(t, target, C);
9.      Process unResolved sets affected by resolution step for C;
10.  }
11.  return D';/* Obtained by inserting new tuples into D and assigning
               each (t, A) the value for eq(t, A), i.e., targ(eq(t, A)) */
end
```

FIG. 3

```
Procedure PICKGREEDY ()
Output: The constraint to repair next, and the tuples to resolve
        for the constraint.
begin
1.    bestCost := ∞;
2.    for each FD F = R[X] → R[Y], t ∈ unResolved(F) do{
3.         S := {t' ∈ R : D'(t', X) = D'(t, X)};
4.         if rescost (S, F) < bestCost then
5.              bestFix := (t, S, F); bestCost := rescost(S, F);
6.    }
7.    /* if (FDFirst and bestCost < ∞) then return bestFix; */
8.    for each IND I = R_1[X] ⊆ R_2[Y], t ∈ unResolved(I) do {
9.         Let t* be t' ∈ R_2 with minimum c := rescost(t, t', I);
10.        if (c < bestCost) then
11.             bestFix := (t, t*, I);bestCost := c;
12.        if (inscost(R_2) < bestCost) then
13.             bestFix := (t, new, I);bestCost := inscost(R_2);
14.   }
15.   return bestFix;
end
```

FIG. 4

```
Procedure FD-RESOLVE-TUP(S, F)
Input: Set of tuples S that match on attribute set X,
       FD F = R[X] → R[Y].
begin
1. for each attribute A in Y do {
2.     eq_A := ∪_{t∈S} eq(t, A);
3.     ε := (ε − {eq(t, A) : t ∈ S}) ∪ {eq_A};
4. }
end
```

FIG. 5

```
Procedure IND-RESOLVE-TUP(t, target, I)
Input: Tuple t ∈ R_1 to resolve, a target target which is either a
       tuple t' ∈ R_2 or new, IND I = R_1[X] ⊆ R_2[Y]
begin
1. if (target = new) then {
2.     t' := new default tuple in R_2 with 0 weight;
3.     ε := ε ∪ {{(t', A)} : A ∈ attr(R_2)};
4. }
5. for each attribute A in X and corresponding B in Y do
6.     ε := (ε − {eq(t, A), eq(t', B)}) ∪ {eq(t, A) ∪ eq(t', B)};
end
```

EQUIVALENCE CLASS-BASED METHOD AND APPARATUS FOR COST-BASED REPAIR OF DATABASE CONSTRAINT VIOLATIONS

FIELD OF THE INVENTION

The present invention relates to the repair of database violations and, more particularly, to methods and apparatus for cost-based repair of database constraint violations.

BACKGROUND OF THE INVENTION

When overlapping or redundant information from multiple sources is integrated, inconsistencies or conflicts in the data may emerge as violations of integrity constraints on the integrated data. For example, enterprise applications often have separate applications associated with different departments, such as sales, billing, and order- or service-fulfillment, storing overlapping business data. Conflicts in this data may be introduced for many reasons, including misspellings or different conventions used during data entry (e.g., a person's name may appear as "John Smith" and "J. Smith") and different processes and time-scales for performing updates (e.g., address changes may take a few days to a few months to propagate).

This problem becomes particularly evident with data warehousing or other integration scenarios because combining data makes conflicts visible, while errors in a single database can seldom be detected without inspection of the real world or other manual effort. The consequences of poor enterprise data can be severe. For telecommunication service providers, for example, errors routinely lead to problems such as failure to bill for provisioned services, delay in repairing network problems and unnecessary leasing of equipment. As a result, data sources may be integrated in order to reconcile and correct the source data. For example, revenue recovery applications compare billing and service databases to ensure that all services are billed (and presumably vice-versa).

While substantial previous work has explored query answering and constraint repair in inconsistent databases, the bulk of this work restricts repair actions to inserting and deleting tuples. However, in these models, repairs of inclusion dependencies may lose important information. Recent work has introduced repairs in which attribute values are modified to restore the database to a consistent state, allowing more satisfying resolution of common constraint violations. Record linkage is a broad field, also known as "duplicate removal" or "merge-purge," and refers to the task of linking pairs of records that refer to the same entity in different data sets. This is commonly applied to household information in census data, mailing lists or medical records as well as many other uses.

A number of techniques have proposed the modification of attribute values for restoring constraints. See, for example, Franconi et al., "Census Data Repair: A Challenging Application of Disjunctive Logic Programming," Proc. Logic for Programming, Artificial Intelligence and Reasoning 2001 (LPAR'01), 561-578, (2001); and J. Wijsen, "Condensed Representation of Database Repairs for Consistent Query Answering," Int'l Conf. on Database Theory (ICDT) (2003). The applicability of these existing techniques, however, is restricted to specific databases or certain constraints. For example, Franconi et al. consider detecting and solving conflicts for specific census databases of a fixed schema. J. Wijsen studies consistent answer of conjunctive queries in the presence of universal (full) constraints.

A need therefore exists for a method and apparatus for modifying attribute values to restore constraints using a cost-based notion of minimal repairs. A further need exists for a method and apparatus for modifying attribute values for restoring a plurality of constraints over an arbitrary number of tables. Yet another need exists for an equivalence class-based method and apparatus for modifying attribute values for restoring constraints.

SUMMARY OF THE INVENTION

Generally, methods and apparatus are provided for identifying constraint violation repairs in data that is comprised of a plurality of records, where each record has a plurality of cells. A database is processed, based on a plurality of constraints that data in the database must satisfy. At least one constraint violation to be resolved is identified based on a cost of repair and the corresponding records to be resolved and equivalent cells are identified in the data that violate the identified at least one constraint violation. A value for each of the equivalent cells can optionally be determined, and the determined value can be assigned to each of the equivalent cells. The at least one constraint violation selected for resolution may be, for example, the constraint violation with a lowest cost.

The cost of repairing a functional dependency constraint can be determined using a hash of all tuples that violate the functional dependency constraint, wherein keys of the hash are attribute values that appear on one side of the functional dependency constraint that determine attribute values appearing on a second side of the functional dependency constraint and wherein the keys point to all tuples having the attribute value. The cost of repairing a tuple that violates an inclusion dependency constraint can be determined by considering the cost of repairing a set of attributes of the violating tuple appearing on one side of the inclusion dependency constraint with the corresponding attributes of each tuple in a table appearing on a second side of the inclusion dependency constraint.

According to a further aspect of the invention, a cost of repairing a constraint is based on a distance metric between the attributes values. For example, the cost can be based on a distance between the attributes values multiplied by a weight of each changed attribute.

A more complete understanding of the present invention, as well as further features and advantages of the present invention, will be obtained by reference to the following detailed description and drawings.

BRIEF DESCRIPTION OF THE DRAWINGS

FIG. 1 illustrates sample tables from an exemplary customer table and equipment table and corresponding constraints associated with the tables;

FIG. 2 illustrates exemplary pseudo code for a GEN-REPAIR algorithm incorporating features of the present invention;

FIG. 3 illustrates exemplary pseudo code for a PICKNEXT algorithm invoked by the GEN-REPAIR algorithm of FIG. 2;

FIG. 4 illustrates exemplary pseudo code for a FD-RESOLVE-TUP algorithm invoked by the GEN-REPAIR algorithm of FIG. 2;

FIG. 5 illustrates exemplary pseudo code for a IND-RESOLVE-TUP algorithm invoked by the GEN-REPAIR algorithm of FIG. 2.

DETAILED DESCRIPTION

Figure 6:
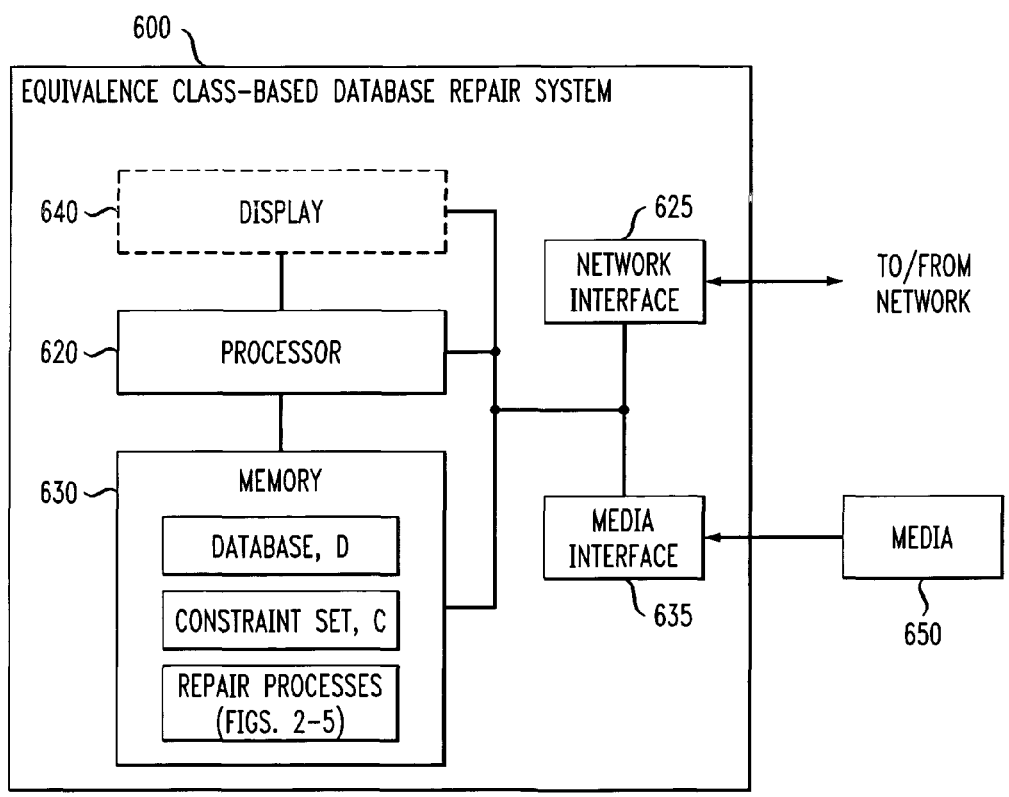
FIG. 6 is a schematic block diagram of an equivalence class-based system for repairing database constraint violations in accordance with the present invention.

The present invention provides equivalence class-based methods and apparatus for modifying attribute values to restore constraints using a cost-based notion of minimal repairs. Attribute values can be modified to restore a plurality of constraints over an arbitrary number of tables.

Running Example and Constraint Terminology

Example 1

Consider a hypothetical provider of network services to residential users (e.g., a phone or cable company). Customer and equipment information is maintained by separate databases in the Billing and Maintenance departments. Data from these two databases is merged according to the following target schema with two tables, cust and equip:

cust (phno, name, street, city, state, zip)
equip (phno, semo, eqmfct, eqmodel, instdate)

The cust table contains address information on customers with phone number as a key, while the equip table catalogs equipment installed at the customer's location and includes manufacturer, model number, install date and the serial number which serves as the key. FIG. 1 depicts an example instance, V, of the cust table 110 and equip table 130. Tuples are labeled as $t_o$, $t_1$, ... for ease of reference, and tuples $t_0$, $t_1$, $t_5$, $t_6$ are from the Billing database. As used herein, the term tuple may be used interchangeably with the term "record."

FIG. 1 also shows the set C of Inclusion Dependencies (referred to as IND (i)) 150 and Functional Dependencies (referred to as FD (i)) 170 on D. For example, IND (1) ensures that every piece of equipment is associated with a valid customer in cust, while FDs (2) and (5) are key dependencies specifying that phone number and serial number are keys for the customer and equipment tables, respectively. FD (6) is not a traditional key dependency, but asserts (perhaps somewhat arbitrarily) that a given customer will have only one instance of a given piece of equipment.

The wt column in each table 110, 130 of FIG. 1 does not appear in the original data, and instead reflects the confidence placed by the user in the data. In this example, a greater confidence is placed in records from Billing.

An example of a source database inconsistency is different spellings for "Alice Smith" in tuples $t_0$ (from Billing) and $t_4$ (from Maintenance), which violates FD (2). Other constraint-violating discrepancies include a) the tuples $t_1$ and $t_2$ for Bob Jones with different phone numbers and states, which violate FDs (3) and (4), and b) the tuple $t_9$ which violates the inclusion dependency IND (1) between the equip and cust tables 110, 130.

As previously indicated, repairs of inclusion dependencies may lose important information. For example, deletion of tuple $t_9$ to repair the violation of inclusion dependency ID (1) in FIG. 1 would lose information about a piece of equipment, and inserting a new tuple in the cust table would not help the user resolve the location of that equipment accurately.

The present invention recognizes that there are strong connections between record linkage and constraint violation repair. First, individual repairs of Inclusion and Functional Dependencies involve entity matching. Consider IND(1) in example 1: repairing this constraint requires matching customer entities, in this case represented by their phone numbers. If this constraint were specified on several attributes including name and address information, the task of finding the appropriate repair for an unmatched tuple in the equipment table would exactly correspond to a record linkage task. Second, specific record linkage tasks for a set of tables can be accomplished by specifying inclusion and functional dependencies and then invoking constraint violation repair. Consider the task of removing approximate duplicates between two tables R and S. This may be accomplished by specifying a pair of inclusion constraints from R to S and back on the set of attributes which should match (perhaps all the attributes). While there is a compelling need to help users correct conflicting data, it may be difficult to see what sort of automatic support will be helpful. Clearly, it would be helpful to a user to enumerate constraint violations, but it may still be exceedingly onerous for the user to manually correct all the problems. In this situation, it may be more helpful to automatically propose a repair, which can be informally thought of as a database that is "close" to the original but which satisfies integrity constraints.

According to one aspect of the present invention, a repair framework is disclosed that focuses on value modification, but which improves on previous work in several ways. First, the disclosed general framework deals with both FDs and INDs. Furthermore, unlike prior approaches to measuring repair costs, a cost is associated with each repair based on the two concepts of similarity and accuracy. Similarity of data is captured at the attribute or tuple level with appropriate methods from the data linkage community. The accuracy of data is reflected in a weight w(t) for each tuple and reflects the confidence placed by the user in the values therein. For example, the tuples in FIG. 1 from the Billing department are given weight 2, reflecting greater confidence than records from the Maintenance department, which are given a weight 1.

According to another aspect of the present invention, minimum-cost constraint violation repair is employed based on value-modification. Value-modification complicates the analysis of the problem: it becomes NP-complete in the size of the data, even with a small, constant number of either FDs or INDs. In contrast, the corresponding problems in which a database is repaired by deleting a minimal set of tuples is in PTIME, and the problem becomes intractable if arbitrary FDs and INDs are both present. In this context, simple heuristic repair approaches based on repairing one constraint at a time suffer from a number of problems including a failure to terminate.

In light of the intractability results and demonstrated problems with simple heuristics, another aspect of the invention provides an approach to repair construction based on equivalence classes of (tuple, attribute) pairs that are assigned identical values in the repair. The introduction of equivalence classes has three benefits. First, it is fundamental to ensuring termination of the algorithm, even when tuple inserts are allowed. Second, it separates the relationship among attribute values (represented by the equivalence classes) from the choice of the value assigned to each attribute in the suggested repair (dictated by a cost metric). This separation has the potential to improve value selection by delaying it until a larger group of related values is known. For example, the number "555-8145" is the highest weighted value of all the numbers for Bob Jones, but locally in the equip table the phone number "555-8195" may look like a better choice. Third, equivalence classes potentially ease user interaction by illustrating the relationships between parts of a proposed repair and allowing the user to validate updates one equivalence-class at a time.

In this framework, a straightforward use of the greedy method is first considered. In the example of FIG. 1, the exemplary repair procedure will group the phone number attributes of $t_1$ and $t_2$ in a singe equivalence class, and pick one of the values as the value proposed in the repair. Different cost models are considered for the greedy step, as well as a variant of the greedy method which resolves functional dependencies aggressively. While naive implementations of the greedy methods require time cubic in the size of the data in practical cases, two optimizations are introduce, one which relaxes the greedy method by sometimes taking a step which is not locally optimal, and another inspired by optimizations for duplicate elimination. Together, these optimizations improve the running time of the algorithms to time $O(n \lg n.|C|)$, where n is the size of the database including inserted tuples, and C is the set of constraints to be enforced.

The disclosure is organized as follows. Initially, a repair model is introduced in a section entitled "System Model and Problem Formulation." Thereafter, intractability results are discussed and a heuristic approach is presented in a section entitled "Constraint Violation Repair Approach Overview," with detailed algorithms presented in the section entitled "Detailed Algorithms."

System Model and Problem Formulation

In this section, a cost-based constraint violation repair problem formulation is presented. In the disclosed model, each database instance D (equivalently "database") contains a fixed set of tables $R_1, \ldots, R_n$ where table $R_i$ is defined over a set of attributes $attr(R_i)$. Each tuple t is associated with a table $R_i$ and a weight $w(t)$ greater than or equal to 0. Generally, the weight reflects the accuracy of the information, typically propagated from the original data sources. To simplify the discussion, it is assumed that one can keep track of a given tuple t in $R_i$ when its attribute values are changed (via, e.g., a unique id), and denote the tuple by t. D(t,A) denotes the value of a given attribute $A \in attr(R_i)$ of t in database V. This value is drawn from dom(A), the domain of A, plus a default value Vd(A) for each attribute A (a default value can be a null). If $t \notin D$, then D(t,A) equals Vd(A). Further, for a subset X of attributes from $attr(R_1)$, D(t, X) represents the projection of t on attributes in X.

The following two types of constraints are considered:

1. Functional Dependencies (FDs)—each functional dependency has the form $R\{X\} \to R\{Y\}$, where X and Y are subsets of attributes from attr(R). A database D is said to satisfy the FD $R\{X\} \to R\{Y\}$ if for every pair of tuples $t_1, t_2 \in R$ such that $D(t_1, X) = D(t_2, X)$, it is the case that $D(t_1, Y) = D(t_2, Y)$.

2. Inclusion Dependencies (INDs)—inclusion dependencies have the form $R_1\{X\} \subseteq R_2\{Y\}$—here X and Y are lists of attributes (with the same cardinality) from $attr(R_1)$ and $attr(R_2)$, respectively. A database D is said to satisfy the IND $R_1\{X\} \subseteq R_2\{Y\}$ if for every tuple $t_1 \in R_1$ there exists a tuple $t_2 \in R_2$ such that $D(t_2, Y) = D(t_1, X)$.

A database D satisfies a constraint set C of FDs and INDs if it satisfies every constraint in C.

Un-Normalized Data

While in the examples given, the data has been completely normalized to a common schema, this assumption can be dropped at the cost of including normalizing functions in constraint definitions. For example, if a function f is available to map data values from $R\{A\}$ to $S\{B\}$, then a slightly more powerful form of inclusion dependency between $R\{A\}$ and $S\{B\}$ can be defined that requires, for all $r \in R$, that some tuple $S \in S$ such that $f(r.A) = s.B$.

Database Repairs

A repair of a database D is a database D' such that 1) tuples appearing in D are carried over to D' (identified by, e.g., an identifier), possibly with modified attribute values, 2) zero or more inserted tuples appear in D' but not in D, and 3) D' satisfies the constraint set C. For convenience, the inserted tuples appearing in table $R_i$ in D' are referred to as new($R_i$).

Intuitively, an inconsistent database is typically neither sound nor complete, and thus the disclosed model supports both value modifications and tuple insertions. The values of tuples in D are modified rather than simply deleting them as in other models in order to minimize loss of information.

Repair Cost

As previously indicated, the cost of a repair is based on the accuracy captured by the weight $w(t) \geq 0$ of a changed tuple and the distance according to a similarity metric between the original value of an attribute and its value in the repaired database. Intuitively, the cost of a modified attribute is the cost of "dragging" the weight of the tuple over the "distance" between the attribute's old and new values. Finally, a table-dependent charge is assessed for inserting a tuple. Note that weights are assigned at the tuple level for simplicity of presentation, but in practice attribute-level weights may be advantageous.

Pattern matching and similarity measurement for strings and other structured values is itself a broad field, and our setting does not depend on a particular approach. Rather, it is assumed that for two values v, v' from the same domain, a distance function dis(v, v') is available, with lower values indicating greater similarity. A common distance function for strings (the Damerau Levenshtein metric) is defined as the minimum number of single-character insertions, deletions and substitutions required to transform v to v'. This metric is used in the examples below.

Finally, a cost inscost(Ri)>0 is assumed to be associated with inserting tuples into each table $R_i$ in D'. This cost is a user-defined parameter, but is closely related to the threshold set for a good match by the similarity metric. In practice this is data dependent, and the data linkage community has proposed techniques for automatically setting this value.

The cost of a repair is the sum of the cost of the tuples in the repair. To summarize:

$$\text{Cost}(t) = \begin{cases} ins\ \text{cost}(R_i) & \text{if } t \in\ \text{new}(R_i) \\ w(t) \cdot \sum_{A \in attr(Ri)} dis(D(t, A), D'(t, A))) & \text{otherwise} \end{cases}$$

For example, consider $t_2$ in the repair described at the end of Example 1. Given $w(t_2)=1$ and string edit distances of 1 both from "555-8145" to "555-9145" and from "nj" to "ny," the cost$(t_2)=1 \cdot (1+1)=2$, while if $t_1$'s phone number and state had been modified instead, the cost would have been $2 \cdot (1+1) = 4$ since $w(t_1)=2$. The cost of the repair D' of database D is defined as $\text{cost}(D')=\Sigma_{t \in D'} \text{cost}(t)$.

Problem Statement

Given a database D, comprising tables $R_1, \ldots, R_n$ and a set of constraints C defined on them, the challenge is to find the repair D' of D for which cost(D') is minimum.

Constraint Violation Repair Approach Overview

Solutions to the constraint violation repair problem defined in the previous section are now discussed.

Constraint Violation Repairs

In general, it is useful to think of a database repair D' as the result of some modifications and insertions to database D used to repair constraint violations. For instance, consider the FD $F=R\{A\} \to R\{B\}$ over attributes A and B of table R, and let $t_1, t_2$ be a pair of tuples in R that violate F, that is, $D(t_1, A)=D(t_2, A)$, but $D(t_1, B) \neq D(t_2, B)$. In this case, this constraint violation can be resolved by setting $t_1$'s B-attribute value to be equal to $t_2$'s (or vice versa) in the repair D'. Note that it is also possible to fix the FD by setting the value of attribute A in tuple $t_1$ to be different from the A-attribute value in tuple $t_2$. This option is generally not considered for FD repair because it is unclear as to what (different) value should be assigned to tuple $t_1$'s A attribute, and moreover, when the FDs are keys, it may lead to insertions of entities that are not meaningful.

Similarly, INDs can be repaired by modifying attribute values. For example, if a tuple $t_1 \in R_1$ does not satisfy IND $I=R_1\{A\} \subseteq R_2\{B\}$, then $t_1$'s A-attribute value can be modified so that it is equal to the B-attribute value for some tuple in table $R_2$. (Note that this is especially attractive if the values were similar to begin with.) Alternately, the B-attribute value for some topic in $R_2$ can be modified so that it is equal to $t_1$'s A-attribute value. Finally, if several tuples in $R_1$ match on values in A but no similar value exists in $R_2$, inserting a tuple $t^{new}$ in $R_2$ (in D') to cover these tuples may be preferable to either alternative. In this case, the B attribute(s) of $t^{new}$ are set to match $t_1$'s A attribute(s) (in D'), and all other attribute values are set to corresponding default values.

A subtle issue arises from the null value. The SQL standard supports three different semantics for comparing the values of $D(t_1, X_1)$ and $D(t_2, X_2)$ which may involve null, where $X_1, X_2$ are sequences of attributes. First, the simple semantics defines $D(t_1, X_1)=D(t_2, X_2)$ to be true if either one of them contains null. Second, the partial semantics evaluates $D(t_1, X_1)=D(t_2, X_2)$ to true if each non-null value in $D(t_1, X_1)$ equals its corresponding value in $D(t_2, X_2)$ and vice versa. Third, the full semantics evaluates $D(t_1, X_1)=D(t_2, X_2)$ to false if either one of them contains null. While the SQL standard does not explicitly support arbitrary FDs and INDs, it allows one to use any of the three semantics when dealing with unique and referential constraints, which are (special cases of) FDs and INDs, respectively. The partial semantics can be assumed when the null is involved. It is noted that this semantics allows null to participate in comparisons of attribute values.

Example 2

The above repairs are illustrated by showing how the constraint violations discussed in Example 1 might be resolved.
Record $t_2$: Modify phone number to "555-8145" (repairs FD (4)) and state to "ny" (repairs FD (3)).
Record $t_4$: Modify name to "Alice Smith" and street to "17 bridge" (repairs FD(1)).
Record $t_7$: Modify phone number to "555-8145" (repairs IND (1)), serial number to "L54001" (repairs FD (6)) and installation date to "January-03" (repairs FD (5)).
Record $t_8$: Modify phone number to "555-8145" (repairs IND(1)).
Record $t_9$: Modify phone number to "949-1212" (repairs IND(1)).

Minimum-Cost Repair (Intractability Results)

Two intractability results are presented for min-cost database repair, showing that the problem is NP-complete even for a small, fixed number of only FD or only IND constraints.

Theorem 1: Let C be a set of only FD or only IND constraints defined on database D. Then, for a constant W, the problem of determining if there exists a repair of D whose cost is at most W is NP-complete.

Delete-Only Repairs—The corresponding repair problems (when C contains only FDs or only INDs) have been shown to be tractable for a delete-only repair model. This demonstrates that the repair problem becomes much more difficult when value modifications are considered. More importantly, in many cases, meaningful repairs can only be obtained by modifying attribute values as opposed to deleting or even inserting tuples, as shown by the following example.

Example 3

Consider the repair step for $t_9$ in Example 2 for tuple $t_9$ that modifies the erroneous phone number field from "949-2212" to "949-1212" to repair IND (1). However, when attribute value modifications are disallowed, the only options to repair IND (1) are to either insert a new topic into the customer table with the erroneous phone number "949-2212" or delete the tuple $t_9$ which would cause important customer equipment information to be lost forever. In a delete-only model, this is the only choice.

Sequential Repair

In light of Theorem 1, heuristic approaches are considered to constraint violation repair. Generally, a heuristic algorithm takes as input a database D and a set C of constraints defined on D and finds a repair D' of D. The algorithm should be able to find D' efficiently, with the tradeoff that cost(D') is not necessarily minimum. Previous work on inconsistent databases have not explored heuristic approaches to constraint violation repair.

It is nontrivial to develop a good heuristic algorithm to repair FDs and INDs. An obvious approach to repairing D is to repair one constraint in C at a time, an approach referred to as "sequential-repair." Finding a low-cost repair for a single constraint is at least simplified by the need to deal with only one or two tables (in the case of an IND constraint). As each constraint is visited and resolved using the smallest cost modifications, the required modifications would be collected (and built on as the algorithm progresses), until a valid repair is constructed. However, it is easy to see that repairing one constraint may break the repair of another. Worse still, as the following example illustrates, constraint-by-constraint violation repair may fail to find any repair of D, let alone one with a small cost since constraints in C may interact in a way that would cause sequential-repair to loop forever.

Example 4

Consider tuples $t_1$, $t_2$ in the cust table 110 and $t_6$-$t_8$ in the equip table 130 in FIG. 1 relating to customer Bob Jones. Tuples $t_1$, $t_2$ do not satisfy FD (4) since the phone numbers in the topics do not match. In order to satisfy the FD, the phone number field in $t_2$ will be modified to "555-8145" since $t_1$ has a higher weight, and thus this modification has the smaller cost. However, this would end up violating IND (1) since the equip table contains two tuples ($t_7$ and $t_8$) with the phone number "555-8195" which no longer appears in the cust table 110. Now fixing the IND will revert the value for phone number in topic $t_2$ back to its original value of "555-8195" since this would restore the IND without requiring any modifications to database values. However, the original database state returns in which FD (4) does not hold, and the repair procedure would cycle forever. Thus, database constraints will never be satisfied.

Equivalence-Class-Based Repair

The above example presents a scenario in which a heuristic constraint-by-constraint violation repair procedure is confounded by even simple constraints. On a larger database with more complex constraints, such problems will be much more difficult to address. Accordingly, a repair technique is needed that can take into account the complex interactions among the FDs and INDs in C, guarantee to terminate, and still find a low-cost repair. Further, since a repair is a proposal to the user, it should be easy to understand and modify the decisions made by the repair procedure.

The disclosed approach to constraint violation repair for FDs and INDs is built around the notion of equivalence classes of attribute value "coordinates" (t, A), where t identifies a topic in a table R in which A is an attribute. The semantics of an equivalence class of (t, A) pairs is that the topic attributes contained in the class are assigned the same value in D'. Equivalence classes are considered because both FD and IND constraints can be seen as specifying equivalence between certain sets of attribute coordinates. For example, an FD R$\{X\} \rightarrow$R$\{Y\}$ essentially specifies that if a pair of tuples $t_1$, $t_2$ in R matches on the attribute set X, then ($t_1$, A) and ($t_2$, A) must be in the same equivalence class for all A∈Y. Similarly, for an IND $R_1$ $\{X\} \subseteq R_2$ $\{Y\}$, each tuple $t_1 \in R_1$ must be covered by some tuple $t_2 \in R_2$, or alternately, ($t_1$, A) and ($t_2$, B) must be in the same equivalence class for each attribute A in X and the corresponding attribute B in Y.

Generally, the disclosed repair algorithm begins by putting each tuple, attribute pair in its own equivalence class. It then greedily merges the equivalence classes of (t, A) pairs until all constraints in C are satisfied. Revisiting Example 4, consider the tuples for Bob Jones in FIG. 1. In order to satisfy FD (4), tuples $t_1$ and $t_2$ are grouped on phone number to form the equivalence class $\{(t_1, phno), (t_2, phno)\}$. Next, to ensure that IND (1) holds, the following equivalence classes are formed:

eq=$\{(t_1, phno), (t_2, phno), (t_5, phno)\}$. This ensures that tuple $t_5$ in equip is covered by $t_1$ and $t_2$ in cost.

eq=$\{(t_1, phno), (t_2, phno), (t_5, phno), (t_7, phno), (t_8, phno)\}$. This ensures that tuples $t_7$ and $t_8$ are also covered by $t_1$ and $t_2$.

Thus, in the final repaired database, all tuples for Bob Jones ($t_1$, $t_2$, $t_6$-$t_8$) will have identical phone number values; as a result, these tuples will satisfy constraints FD (4) and IND (1). (Additional equivalence classes involving the other attributes will be needed to satisfy the remaining constraints—these are listed in Example 5 after describing the disclosed heuristic in the following section).

A key observation here is that it is useful to separate the decision of which attribute values need to be equivalent from the decision of exactly what value should be assigned to the eventually-produced equivalent set. Delaying value assignment allows poor local decisions to be improved—for example, consider a name that is sometimes spelled correctly and sometimes incorrectly. If the correct spelling is more frequent and/or has higher weight, then the accumulation of versions of the name in an equivalence class over time will allow the correct spelling to be chosen in many cases. Further, it is believed that the equivalence class abstraction will be valuable to a user who needs to check or modify a repair. The classes help expose the structure of data relationships, and if the user wants to override a value chosen by the repair algorithm, it can be accomplished on the whole equivalence class in one step.

Detailed Algorithms

Equivalence-class-based constraint violation repair is now discussed in detail. The disclosed techniques for equivalence-class-based constraint violation repair employ a general heuristic framework that guarantees termination, and develop two specific heuristic methods GREEDY-REPAIR and GREEDY-REPAIR-FDFIRST.

Equivalence Classes

An equivalence class eq is a set of tuple, attribute pairs (t, A) such that the domains of each attribute in the equivalence class are the same. The disclosed repair algorithm 200, discussed below in conjunction with FIG. 2, maintains a global set of equivalence classes ϵ that covers D' (that is, the tuples in the original database D plus insertions). For a given pair (t, A), eq(t, A) returns the current equivalence class containing (t, A) in ϵ. Associated with each class eq is a "target value" v equal to targ(eq). The target value is fundamental to the construction of the database repair D' as D'(t, A) is defined as targ(eq(t, A)). Thus, all attributes in a class eq are assigned the value of targ(eq) in the repair.

Equivalence Class Cost—The cost of the equivalence class for a particular target value v is defined as the contribution of elements in the equivalence class to the cost of D' (ignoring the cost of inserts); that is, cost(eq, v)=$\Sigma_{(t,A)\epsilon eq}$w(t)·dis(v, D(t, A)). Consistent with the goal of finding a low-cost repair, v=targ(eq) is chosen to minimize the cost of eq, and unless specified otherwise, cost(eq) is simply the minimum cost(eq, v) over some universe of potential v values, such as the values taken by elements of eq in D. As an example, in the database shown in FIG. 1, for eq $\{(t_1, phno), (t_2, phno)\}$, cost(eq, "555-8145")=1·1 while cost(eq, "555-8195")=2.1. Thus, the value targ(eq) is "555-8145", and cost(eq)=1.

Merging Equivalence Classes—Whenever two equivalence classes are merged, this may result in additional attribute modifications in D', increasing its cost. For a subset E of equivalence classes from ϵ, this increase in cost is formalized as mgcost(E)=cost($U_{eq \in E eq}$)−$\Sigma_{eq \in E}$ cost(eq); that is, the difference between the cost of the merged class and the sum of the costs of the individual classes. For instance, referring back to FIG. 1, the cost of merging classes $eq_1$=$\{(t_1, phno), (t_2, phno)\}$ and $eq_2$=$\{(t_7, phno)\}$ to form $eq_3$=$\{(t_1, phno), (t_2, phno), (t_7, phno)\}$ is given by mgcost($\{eq_1, eq_2\}$)= cost(eq3)−(cost($eq_1$)+cost($eq_2$))=2−(1+0)=1.

Repairing Violations

Individual constraint violations are repaired by resolving tuples.

Repairing an FD Violation—A tuple t is resolved with respect to an FD F=R$\{X\} \rightarrow$R$\{Y\}$ if, for all other tuples t'∈R, either D'(t, A)≠D'(t', A) for some A∈X, or for every B∈Y, eq(t, B)=eq(t', B). Note that if t is resolved, it is not part of a violation in D', but the converse need not hold since for some B∈Y, (t, B) might have the same target value as (t', B) without (t, B) and (t', B) being in the same equivalence class. Clearly, a tuple t∈R can become unresolved with respect to F due to a change in the target value of an attribute in X for some other tuple in R, a fact referred to as the collision property of FD resolution. This might happen, for example, due to changes in target values when equivalence classes merge.

While a violation can be explained in terms of pairs of tuples, the act of resolving a tuple t with respect to F is defined in terms of a set S of tuples from R. S includes t and all other tuples that agree with t on (target values of) attributes in X. The exemplary procedure FD-RESOLVE-TUP 400, discussed below in conjunction with FIG. 4, shows how to resolve such a set S by merging, for each attribute A in Y, the equivalence classes eq(t, A) for t∈S. Accordingly, rescost(S, F), the merge cost of resolving S with respect to F, is the sum, for each attribute A in Y, of mgcost($\{$eq(t, A): t∈S$\}$). For example, in FIG. 1, the tuple set $\{ti, t_2\}$ is resolved with respect to FD (4) by merging the classes $eq_1$=$\{(t_1, phno)\}$ and $eq_2$=$\{(t_2, phno)\}$. Thus, rescost($\{t_1, t_2\}$, 4)=mgcost($\{eq_1, eq_2\}$)=1.

Repairing an IND Violation—For an IND I=$R_1\{X\} \subseteq R_2\{Y\}$, a tuple t is said to be resolved with respect to I if there is some tuple t'∈$R_2$ such that (t, A) and (t', B) are in the same equivalence class for every pair of corresponding attributes A∈X and B∈Y. It is easy to see that, in contrast to FDs, a topic resolved with respect to an IND I will not become unresolved, a fact referred to as the permanency property of IND resolution. Thus, by resolving all topics with respect to INDs, it can be ensured that no INDs are violated.

Tuple t is resolved by "covering" it with either a new or existing tuple t'∈R$_2$. Here, a new tuple t' consists of null, i.e., D' (t', A)=null for each attribute A of t'. This is accomplished by the exemplary procedure IND-RESOLVE-TUP 500, discussed below in conjunction with FIG. 5. As discussed further below, the IND-RESOLVE-TUP procedure 500 creates t' if required, and merges eq(t, A) with eq(t', B) for corresponding attributes A and B from X and Y, respectively. Accordingly, the cost of resolving t with respect to I using t', rescost(t, t', I), is the sum of the attribute-wise costs, mgcost({eq(t, A), eq(t', B)}) for corresponding attributes A and B, plus the insert cost of t' if it is new. (Note that if t' is new, then rescost(t, t', I) is simply inscost(R$_2$) since t' is assigned 0 weight.) For example, in FIG. 1, tuple t$_7$ can be resolved with respect to IND (1) by merging the classes eq$_1$={(t$_1$, phno)} and eq$_2$={(t$_7$, phno)}. Thus, rescost(t$_7$, t$_1$, 1)=mgcost({eq$_1$, eq$_2$})=1.

Tracking Unresolved Tuples—The overall approach resolves (unresolved) tuples one at a time, until no unresolved tuples remain. While not strictly required for correctness, an important efficiency optimization is to keep track of potentially unresolved tuples for each dependency in C. To accomplish this, a data structure unResolved(C) is maintained that maps each constraint C∈C to a set of tuples.

Repair with Equivalence Classes

FIG. 2 illustrates exemplary pseudo code for a GEN-REPAIR algorithm 200 incorporating features of the present invention. The GEN-REPAIR algorithm 200 is the overall driver for the constraint violation repair procedures. Generally, the exemplary GEN-REPAIR algorithm 200 is abstracted in terms of a function PICKNEXT 300, discussed below in conjunction with FIG. 3, that selects the next tuple t to be resolved with respect to a constraint C. If C is an FD R[X]→R[Y], then PICKNEXT also returns the target set of tuples to resolve—this set essentially consists of tuples in R that agree with t on attributes in X. On the other hand, if C is an IND, then the target returned by PICKNEXT is either another tuple t' or "new" to indicate that t should be covered by a newly-created tuple.

The exemplary GEN-REPAIR algorithm 200 ensures that the maintained unResolved sets satisfy the following two invariants: (1) If t is unresolved with respect to I=R$_1$[X] ⊆R$_2$[Y], t∈unResolved(I), and (2) If t is unresolved with respect to F=R[X]→R[Y], then some tuple t' which matches t on attributes in X is guaranteed to be in unResolved(F); here t' serves as a proxy for t, and when it is resolved, t will also be resolved.

The exemplary GEN-REPAIR algorithm 200 initially initializes the unresolved sets to preserve these above-mentioned invariants. Thus, during line 2, for each IND I=R$_1$[X] ⊆R$_2$[Y], unResolved(I) is initially set to {t:t∈R$_1$}. For each FD F=R[X]→R[Y], unResolved(F) is initialized to contain all the tuples in R.

Thereafter, the exemplary GEN-REPAIR algorithm 200 enters a loop at line 3 to process the unresolved sets. The function PICKNEXT (FIG. 3) is executed by the GEN-REPAIR algorithm 200 at line 4 to select the next tuple t to be resolved with respect to a constraint C. If C is an FD R[X] →R[Y], then PICKNEXT also returns the target set of tuples to resolve (essentially, tuples in R that agree with t on attributes in X), and the FD-RESOLVE-TUP function 500 is executed at line 6 to merge the members of the equivalence class. The FD-RESOLVE-TUP function 500 processes the set of tuples S that match on attribute set X. The FD-RESOLVE-TUP function 500 identifies all the cells in the database that must be fixed.

If, however, the C returned by PICKNEXT 300 is an IND, then the target returned by PICKNEXT is either another tuple t' or "new" to indicate that t should be covered by a newly-created tuple and the IND-RESOLVE-TUP function 500 (FIG. 5) is executed at line 8 to resolve a tuple t for an IND I. As previously indicated, a tuple t is resolved by "covering" it with either a new or existing tuple t'∈R$_2$. The IND-RESOLVE-TUP procedure 500 creates t' if required, and merges eq(t, A) with eq(t', B) for corresponding attributes A and B from X and Y, respectively. Accordingly, the cost of resolving t with respect to I using t', rescost(t, t', I), is the sum of the attribute-wise costs, mgcost({eq(t, A), eq(t', B)}) for corresponding attributes A and B, plus the insert cost of t' if it is new. (Note that if t' is new, then rescost(t, t', I) is simply inscost(R$_2$) since t' is assigned 0 weight.) For example, in FIG. 1, tuple t$_7$ can be resolved with respect to IND (1) by merging the classes eq$_1$={(t$_1$, phno)} and eq$_2$={(t$_7$, phno)}. Thus, rescost(t$_7$, t$_1$, 1)=mgcost({eq$_1$, eq$_2$})=1.

Thereafter, during line 9 of GEN-REPAIR, after each resolution step, the unResolved set is maintained. When a tuple t is resolved with respect to a constraint C, the following actions are taken: 1) t is removed from unResolved(C), 2) a newly inserted tuple into table R is added to unResolved(C) if C is an FD on table R or an IND of the form R[_]⊆[_], and 3) if resolution causes equivalence class merging, such that targ (t, A) changes due to the merge, then (t, A) is added to unResolved(F) for any F=R[X]→R[Y] where T∈R and A∈X. Actions 1-3 preserve the two invariants on unResolved sets, since this follows directly from the permanency and collision properties of INDs and FDs, respectively.

The proposed repair D' is produced by inserting new tuples and replacing (t, A) values in D with targ(eq(t, A)). The arbitrary selection of what tuple and constraint to address represents the degree of freedom for designing an equivalence-class-based technique, and two intuitive greedy approaches are presented hereinafter, discussed below in conjunction with FIG. 3.

Termination and Correctness—The same tuple may enter and leave unResolved (F) for an FD F many times. Nevertheless, it can be shown that PICKNEXT selects a tuple from unResolved to resolve next and returns only a bounded number of new tuples to fix IND constraints, and GEN-REPAIR invokes PICKNEXT at most n·a times, terminates and produces a repair D' of D, where n is the number of tuples in the database (including newly inserted tuples) and a is the maximum number of attributes in a table.

Theorem 2: The number of tuple inserts is bounded for PICKNEXT, and GEN-REPAIR terminates and produces a repair D' of D that satisfies the constraints in C.

Correctness follows from the fact that unResolved is empty when GEN-REPAIR terminates, and thus, due to the invariants maintained on unResolved, all tuples are resolved with respect to constraints in C at termination.

Two Flavors of Greedy Repair

As previously indicated, the function PICKNEXT (FIG. 3) is executed by the GEN-REPAIR algorithm 200 at line 4 to select the next tuple t to be resolved with respect to a constraint C. Two exemplary implementations of the PICKNEXT algorithm are discussed herein. GREEDY-REPAIR and GREEDYREPAIR-FDFIRST are generated by making simple changes to PICKNEXT. The first exemplary algorithm, GREEDY-REPAIR, is built from GEN-REPAIR by replacing PICKNEXT with PICKGREEDY, shown in FIG. 3. PICKGREEDY picks and returns an unresolved tuple to repair with the minimum rescost and the tuples to resolve for the constraint. In the case of an IND constraint, PICK-GREEDY also returns the lowest cost target of the resolution, which may be a tuple or new if an insert in the target relation is the lowest cost step.

To motivate the next algorithm, GREEDY-REPAIR-FD-FIRST, it is noted that there is a fundamental difference in the manner in which FDs and INDs are repaired in the present framework. FD repair, in many respects, is more rigid than IND repair. For an FD $F=R[X] \rightarrow [Y]$, and a pair of tuples t, t' that violate the FD, repair involves modifying tuple attribute values so that t and t' match on Y. While some flexibility exists in the tuples that are modified (t or t') for each non-matching attribute A in Y, the only choice is between the values appearing in t and t', which may or may not be similar. In contrast, IND repair is much more flexible. For an IND $I=R_1[X] \subseteq R_2[Y]$, and a tuple $t \in R_1$ that violates the IND, repair can be achieved by considering any tuple t' in $R_2$, and modifying attribute values so that t and t' match on the corresponding attributes in X and Y. Essentially, any tuple t' in $R_2$ can be considered as the covering tuple for t in order to repair the IND.

Due to the rigidity of FD repair, the FDFirst variant is considered which gives precedence to fixing FDs. This is accomplished by uncommenting line 7 of PICKGREEDY, so that an unresolved tuple for an FD will be returned if available. If not, the lowest cost tuple for an IND repair is returned.

Example 5

Consider the cust table 110 and equip table 130 in FIG. 1. The sequence of resolution steps performed by the FDFirst variant of the greedy heuristic is traced when it is run on tuples $t_1,t_2,t_6$-$t_8$ for Bob Jones. In the following, the "target value" of an attribute A of tuple t refers to D'(t, A)=targ(eq(t, A)). The following is a list of the steps that result in new classes due to merges.

1. Resolve tuples $t_1,t_2$ with respect to FD (4), since these two tuples match on name, street and zip code (rescost({$t_1$, $t_2$},4)=1). This results in the equivalence class {($t_1$, phno), ($t_2$,phno)} with target value "555-8145". Also, since the phone number in $t_2$ changes, it is added to unResolved(2).

2. Resolve tuples ti, $t_2$ with respect to PD (2) since $t_1$ and $t_2$ now match on phno (rescost({$t_1$,$t_2$},1)=1). This causes classes for $t_1$ and $t_2$ to be merged for every cust attribute, and $t_2$'s target state value to be updated to "ny".

3. Resolve tuples $t_1$ and $t_6$ with respect to IND (1) (rescost ({$t_1$,$t_6$},1)=0). This yields the class {($t_1$,phno),($t_2$,phno),($t_6$, phno)} with value "555-8145".

4. Resolve tuples $t_2$ and $t_7$ with respect to IND (1) (rescost ($t_2$,$t_7$,1)=1). This causes the phone numbers of tuples $t_1$,$t_2$,$t_6$ and $t_7$ to be merged into the same equivalence class with value "555-8145". Since the target value of the phone number attribute for $t_7$ changes to "555-8145", it is added to unResolved (6).

5. Resolve tuples $t_6$ and $t_7$ with respect to FD (6) since their target values now match on phno, (rescost({$t_6$,$t_7$},6)=1). This results in the equivalence class {($t_6$, semo), ($t_7$, semo)}, with value "L54001". Since the target value of the serial number attribute for $t_7$ changes to "L54001", it is added to unResolved (5).

6. Resolve tuples $t_6$ and $t_7$ with respect to FD (5) since they now match on serno (rescost({$t_6$,$t_7$},5).=2). This causes classes for $t_1$ and $t_2$ to be merged for every equip attribute, and $t_7$'s install date value to be updated to "January-03".

7. Resolve tuples $t_2$ and $t_8$ with respect to IND (1). The phone numbers for tuples $t_1$,$t_2$,$t_6$,$t_7$,$t_8$ are merged into the same class with value "555-8145". The value of the phone number attribute for $t_8$ is changed to "555-8145".

Thus, in the final repair, all of Bob Jones' tuples have identical phone number values of "555-8145". Further, the state in tuple $t_2$ is modified to "ny", and the serial number and installation date in $t_7$ are modified to "L54001" and "January-03", respectively. Thus, the tuples $t_1$,$t_2$,$t_6$-$t_8$ satisfy all the FD and IND constraints. Similarly, for Alice Smith's tuples, the heuristic will correct the name and street in tuple $t_4$, and the phone number in tuple $t_9$.

Looking Ahead for FD Costs—In the algorithm GREEDYREPAIR-FDFIRST, FD repair is performed first to limit the effect of cross-tuple merging on the larger equivalence classes created by IND repair. Another approach to minimize undue effects from IND repairs is to attempt to avoid bad repairs (that cause many FD violations) by adding some degree of look-ahead to the cost model. In order to do this, the rescost of tuples is modified to include an approximation of the cost of resolving tuples added to the unResolved set of Functional Dependencies.

Efficiency and Optimizations

In this section, the practical running time of the algorithms GREEDY-REPAIR and GREEDY-REPAIR-FDFIRST are analyzed, and several important optimizations are proposed. To this end, it is assumed that 1) the number of inserts is bounded by the number of tuples in the database and 2) the size of each equivalence class is bounded by a constant, and thus the amortized time cost of all merges is linear in the size of the database. Given these assumptions, in the worst case, in PICKGREEDY, finding the lowest cost target for each tuple in unResolved(C) for a constraint C can take O(n) steps, where n is the total number of tuples (including newly inserted tuples). Thus, the time complexity of PICKGREEDY is $O(n^2 \cdot |C|)^2 \cdot a)$, where a is the largest size of any equivalent class encountered during a run and the overall running time of GEN-REPAIR, in the worst case, is $O(n^3 \cdot |C|)^2 \cdot a)$. Recall from the previous section that GEN-REPAIR invokes PICK-GREEDY at most O(n a) times.

Redundant Computation—First, it is observed that most cost evaluations between one execution of PICKGREEDY and the next are redundant. Thus, let ts(eq) be a timestamp incremented and assigned to each new equivalence class. Let recent(i) be the set of tuples for which the equivalence class of some attribute has a timestamp greater than i. Whenever the lowest cost resolution of a tuple t is determined, the current timestamp is noted as ts(t). Accordingly, to update the lowest cost resolution of t on the next call to PICKGREEDY, if no equivalence classes of I have changed, it suffices to compare with tuples in recent(ts(t)). Since this optimization does not affect correctness, it may always be used. To ensure minimal time is taken to discover FD violations, for each $F=R\{X\} \rightarrow R\{Y\}$, a hash index is maintained on table R keyed on the values that the attributes X have in the current target repair $\Delta'$. As tuple values for attributes in X change in the repair (due to merging of equivalence classes), this hash index is appropriately updated. Since each tuple is involved in a constant number of merges, it can only force a full scan (ignoring recent(i)) a constant number of times, and thus these optimizations improve running time to $O(n^2 \cdot |C|^2 a)$.

Nearby Tuples—To further improve running time, the number of target tuples considered for the resolution of each tuple t should be limited. To this end, techniques from duplicate elimination are employed to limit the set of tuples considered. For each attribute on the ride hand side of an inclusion dependency, a set of indexes of the table is produced based on different features abstracted from the tuple. In particular, one list sorted by attribute value is kept, and another created by first sorting the characters in the attribute (pushing punctuation to the end) and then sorting based on this value. When looking for target tuples with which to resolve t with respect to IND I=$R_1\{X\} \subseteq R_2\{Y\}$, probe values from t's X attributes are used to access each sorted list for each attribute in Y. Tuples are examined, starting with the best-matching attribute according to the attribute-level similarity metric employed. This produces a candidate set of tuples, which is then ordered on the tuple-cost metric, and the first k are returned. The resulting optimization is referred to as NEARBY {k}.

Relaxing Greedy—A third optimization is to relax the PICK-GREEDY so that it is much more efficient, but does not always choose the lowest cost merge to do next. To this end, a queue of unresolved IND tuples is initially created, sorted by the cost of the best known resolution. Whenever the algorithm asks for the lowest cost resolution, the lowest-cost unresolved tuple t in the queue is considered. It's cost is re-computed at this point (using NEARBY if this option is in force), and if t's resolution and its cost are unchanged, it is chosen without examining other tuples (which may now have lower cost). If t's cost has changed, it is resorted into the queue, and the process continues with the next tuple. This technique is referred to as QUEUE. Note that, while the lowest cost step is not always found, QUEUE does ensure that when resolving a tuple t with respect to an IND I, the locally lowest cost tuple from the target table is found with which to cover t. Construction of the queue takes time at most $O(n \lg n |C|^2 \alpha)$ time. Since it is assumed that each merge affects at most a constant number of tuples, at most a constant number of tuples has their cost recomputed in this step. If NEARBY is in effect, each such recomputation also takes a constant amount of time, and n requests for the lowest-cost IND repair also take time at most $O(n \lg n \cdot |C|^2 \alpha)$ time.

Space—Finally, space usage can be substantially improved by 1) not storing Δ' explicitly, 2) only initializing unResolved (C) for tuples violating dependencies, and 3) lazily creating singleton equivalence classes as needed.

System and Article of Manufacture Details

FIG. 6 is a schematic block diagram of an exemplary equivalence class-based database repair system 600 in accordance with the present invention. The equivalence class-based database repair system 600 comprises a computer system that optionally interacts with media 650. The exemplary equivalence class-based database repair system 600 comprises a processor 620, a network interface 625, a memory 630, a media interface 635 and a display 640. Network interface 625 optionally allows the computer system to connect to a network, while media interface 635 optionally allows the computer system to interact with media 650, such as a Digital Versatile Disk (DVD) or a hard drive. Optional video display 640 is any type of video display suitable for interacting with a human user of apparatus 200. Generally, video display 640 is a computer monitor or other similar video display.

As shown in FIG. 6, the memory 630 includes the database, D, and set of constraints, C, processed by the GEN-REPAIR algorithm 200, as well as the processes shown in FIGS. 2 through 5.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for identifying constraint violation repairs in a relational database, said relational database comprised of a plurality of records, each of said records having a plurality of cells, said method comprising the steps of:
    obtaining a relational database and a plurality of constraints that data in said relational database must satisfy;
    identifying at least one constraint violation to be resolved based on a cost of repair and the corresponding records to be resolved; and
    identifying a plurality of equivalent cells in said data that violate said identified at least one constraint violation, wherein said plurality of equivalent cells are assigned a same value to repair said at least one constraint violation, wherein at least one of said steps is performed by at least one hardware device.

2. The method of claim 1, further comprising the step of determining a value for each of said equivalent cells.

3. The method of claim 2, further comprising the step of assigning said determined value to each of said equivalent cells.

4. The method of claim 1, wherein a cost of repairing a functional dependency constraint is determined using a hash of all tuples that violate said functional dependency constraint, wherein keys of said hash are attribute values that appear on one side of said functional dependency constraint that determine attribute values appearing on a second side of said functional dependency constraint and wherein said keys point to all tuples having said attribute value.

5. The method of claim 1, wherein a cost of repairing a tuple that violates an inclusion dependency constraint is determined by considering the cost of repairing a set of attributes of said violating tuple appearing on one side of said inclusion dependency constraint with the corresponding attributes of each tuple in a table appearing on a second side of said inclusion dependency constraint.

6. The method of claim 1, further comprising the step of generating an unresolved set for one or more given constraints that identifies a set of records that are inconsistent for said corresponding given constraint.

7. The method of claim 1, wherein said step of identifying at least one constraint violation based on a cost of repair further comprises the step of selecting a constraint violation with a lowest cost.

8. The method of claim 1, wherein said step of identifying at least one constraint violation is performed for a plurality of constraints.

9. The method of claim 1, further comprising the step of inserting one or more new records into said relational database.

10. The method of claim 1, further comprising the step of determining whether said assigning step introduced one or more additional constraint violations.

11. The method of claim 1, wherein said step of identifying at least one constraint violation based on a cost of repair further comprises the steps of maintaining a current time stamp associated with a time when a cost of repair was last determined for a tuple that violates an inclusion dependency constraint, and if no equivalence classes of said inclusion dependency constraint have changed, comparing said cost of repair with only tuples for which the equivalence class has a time stamp greater than said current time stamp.

12. The method of claim 1, wherein said step of identifying at least one constraint violation based on a cost of repair further comprises the step of identifying target tuples considered for resolution of each tuple based on an attribute-level similarity metric.

13. The method of claim 1, wherein said step of identifying at least one constraint violation based on a cost of repair further comprises the steps of sorting a plurality of constraint violations based on a cost of repair and resolving said constraint violations based on said sort.

14. A method for identifying constraint violation repairs in a relational database, said relational database comprised of a plurality of records, each of said records having a plurality of cells, said method comprising the steps of:
obtaining a relational database and a plurality of constraints that data in said relational database must satisfy;
identifying at least one constraint violation to be resolved based on a cost of repair and the corresponding records to be resolved; and
identifying a plurality of equivalent cells in said data that violate said identified at least one constraint violation, wherein a cost of repairing a constraint is based on a distance metric between attribute values, wherein at least one of said steps is performed by at least one hardware device.

15. The method of claim 14, wherein said cost is based on a distance between the attributes values multiplied by a weight of each changed attribute.

16. A method for identifying constraint violation repairs in a relational database, said relational database comprised of a plurality of records, each of said records having a plurality of cells, said method comprising the steps of:
obtaining a relational database and a plurality of constraints that data in said relational database must satisfy;
identifying at least one constraint violation to be resolved based on a cost of repair and the corresponding records to be resolved; and
identifying a plurality of equivalent cells in said data that violate said identified at least one constraint violation, wherein a cost of repairing a constraint is based on a weight assigned to each record, wherein at least one of said steps is performed by at least one hardware device.

17. An apparatus for identifying constraint violation repairs in a relational database, said relational database comprised of a plurality of records, each of said records having a plurality of cells, the apparatus comprising:
a recordable memory; and
at least one processor, coupled to the recordable memory, operative to:
obtain a relational database and a plurality of constraints that data in said relational database must satisfy;
identify at least one constraint violation to be resolved based on a cost of repair and the corresponding records to be resolved; and
identify a plurality of equivalent cells in said data that violate said identified at least one constraint violation, wherein said plurality of equivalent cells are assigned a same value to repair said at least one constraint violation.

18. The apparatus of claim 17, wherein said processor is further configured to determine a value for each of said equivalent cells and assign said determined value to each of said equivalent cells.

19. The apparatus of claim 17, wherein a cost of repairing a functional dependency constraint is determined using a hash of all tuples that violate said functional dependency constraint, wherein keys of said hash are attribute values that appear on one side of said functional dependency constraint that determine attribute values appearing on a second side of said functional dependency constraint and wherein said keys point to all tuples having said attribute value.

20. The apparatus of claim 17, wherein a cost of repairing a tuple that violates an inclusion dependency constraint is determined by considering the cost of repairing a set of attributes of said violating tuple appearing on one side of said inclusion dependency constraint with the corresponding attributes of each tuple in a table appearing on a second side of said inclusion dependency constraint.

21. The apparatus of claim 17, wherein a cost of repairing a constraint is based on a distance between attributes values multiplied by a weight of each changed attribute.

22. The apparatus of claim 17, wherein said processor is further configured to generate an unresolved set for one or more given constraints that identifies a set of records that are inconsistent for said corresponding given constraint.

23. The apparatus of claim 17, wherein said processor is further configured to maintain a current time stamp associated with a time when a cost of repair was last determined for a tuple that violates an inclusion dependency constraint, and if no equivalence classes of said inclusion dependency constraint have changed, compare said cost of repair with only tuples for which the equivalence class has a time stamp greater than said current time stamp.

24. The apparatus of claim 17, wherein said processor is further configured to identify target tuples considered for resolution of each tuple based on an attribute-level similarity metric.

25. The apparatus of claim 17, wherein said processor is further configured to sort a plurality of constraint violations based on a cost of repair and resolve said constraint violations based on said sort.

26. An article of manufacture for identifying constraint violation repairs in a relational database, said relational database comprised of a plurality of records, each of said records having a plurality of cells, said article of manufacture comprising a tangible machine readable recordable medium containing one or more programs which when executed implement the steps of:
  obtaining a relational database and a plurality of constraints that data in said relational database must satisfy;
  identifying at least one constraint violation to be resolved based on a cost of repair and the corresponding records to be resolved; and
  identifying a plurality of equivalent cells in said data that violate said identified at least one constraint violation, wherein said plurality of equivalent cells are assigned a same value to repair said at least one constraint violation.

* * * * *